Patented Mar. 15, 1938

2,111,050

UNITED STATES PATENT OFFICE 2,111,050

AGRICULTURAL SPRAY MATERIAL

Paul La Frone Magill, Niagara Falls, N. Y., assignor to The E. I. du Pont de Nemours & Company, Wilmington, Del., a corporation of Delaware No Drawing. Application June 9, 1934,
Serial No. 729,919

10 Claims. (Cl. 167—16)

This invention relates to spray compositions, and more particularly to stable cuprous cyanide pastes which on dilution with water form a suspension having superior dispersion stability.

Compositions suitable for agricultural spraying purposes, must possess certain definite characteristics; they must, of course be poisonous to the fungi or insects to be eradicated. It is also desirous that the spraying compositions be available for transportation in a concentrated form which forms a comparatively stable suspension on dilution with water or which forms a precipitate that can again be dispersed by simple agitation.

If one attempts to make a spraying suspension from a crystalline or a non-gelatinous, insoluble inorganic salt, the crystals in most cases settle rapidly from the solution due to their high specific gravity to form a sludge or a hard caked deposit on the bottom of the tank. When once the inorganic salt has separated it is difficult to again produce a suitable suspension due to the tendency for crystal growth in the sludge and/or the tendency of small particles to agglomerate. Since the rate of settling of this type of suspension is increased with an increase in the particle size, the growth or agglomeration of small particles into larger masses will increase the rate of settling and will correspondingly decrease the permanence of the suspension.

One general method for stabilizing dispersions of inorganic salts in an aqueous medium is to add a compound which produces polyvalent anions or polyvalent cations, depending upon the nature of the electrical charge upon the suspended particles. However, I have found that compounds which produce polyvalent anions or polyvalent cations have no substantial effect in maintaining cuprous cyanide dispersed in an aqueous medium. I have tried such compounds as sodium silicate, sodium pyrophosphate, ferric chloride, aluminum sulphate and sodium salicylate. Aqueous suspensions of cuprous cyanide containing these agents were no more permanent than cuprous cyanide suspended in water alone. Further, sodium silicate, sodium pyrophosphate and ferric chloride react with the cuprous cyanide to form deleterious products.

I am aware that protective colloids have heretofore been added to water suspensions of inorganic insecticidal or fungicidal materials to prepare more or less stable spray suspensions. However, I have found that such prior methods do not produce satisfactorily stable spray suspensions of copper cyanide.

The object of this invention is to prepare a stable aqueous cuprous cyanide paste which does not separate upon standing. A further object of this invention is to prepare a stable cuprous cyanide paste which on dilution with water to spraying concentrations produces a dispersion of high stability. A still further object is to prepare a cuprous cyanide spraying dispersion which settles slowly and which produces a sediment or sludge which is again easily and simply dispersed.

I have found that cuprous cyanide paste which shows substantially no settling during storage or transportation may be prepared by subjecting cuprous cyanide to a grinding or disintegrating action in the presence of a protective colloid and water. I have further found that cuprous cyanide paste so prepared is satisfactory for the preparation of cuprous cyanide spray suspensions. Spray suspensions prepared by diluting my cuprous cyanide paste settle more slowly than do suspensions prepared by other means. Further the deposit of cuprous cyanide which slowly separate from my spray suspensions is easily dispersed by simple agitation, and the dispersion so produced has approximately the same stability as the original dispersion. More particularly, I have found that by subjecting a mixture composed of cuprous cyanide a suitable quantity of water and a protective colloid to a violent mechanical action or to a grinding action, the aforesaid stable paste may be prepared. This result can be obtained, for example by subjecting the mixture to the action of a colloid mill, a ball mill or a gear pump operating at high speed.

The following examples illustrate my invention:

Example I

A cuprous cyanide paste was made by mixing 339 gram portions of dry commercial cuprous cyanide into 661 grams of 1% aqueous solution of agar-agar, gelatine or gum tragacanth at 70–80° C. Each paste was ground in a ball mill for eight hours. Portions of 7.2 grams of each paste then were mixed with one liter of water in 1000 c. c. graduated cylinders. This corresponds to two pounds of dry cuprous cyanide per 100 gals. of water. After standing for twenty-four hours, the solutions were still opaque and cloudy indicating a considerable amount of cuprous cyanide still in suspension. The cuprous cyanide that had separated was easily dispersed by stirring. The dispersion formed appeared to have all of the characteristics of the original dispersion showing that there was practically no crystal growth or agglomeration of the cuprous cyanide particles.

*Example II*

Pastes of the same composition as the paste of Example I were prepared by (a) recirculating the paste thru a gear pump designed for pumping liquids operated at 1400 R. P. M. for 30 minutes, (b) by hand mixing, and (c) by mechanical agitation with an electric household mixer for one hour. The pastes were diluted with water to a concentration equivalent to two pounds of dry cuprous cyanide per 100 gal. of water and allowed to stand. The suspension made by diluting the paste prepared by means of the gear pump was equivalent in all respects to the suspension prepared by the ball mill mixing of Example I. The suspensions prepared by diluting the hand mixed, and the mechanically mixed pastes had substantially completely separated within 51 minutes.

*Example III*

The cuprous cyanide pastes made by the method described in Example I and containing agar-agar and gum tragacanth respectively were allowed to stand for one month. The cuprous cyanide in these pastes showed substantially no tendency to settle out during the month's storage.

I have found that the most effective of the various organic colloids for the preparation of stable pastes in accordance with my invention are those colloids which when dissolved in a 0.10% concentration in water give a solution having a Saybolt viscosity at 25° C. above 30 seconds and preferably above 32.5 seconds, as compared with water having a Saybolt viscosity of approximately 29.75 seconds at 25° C.

I have found that my invention is of little or no advantage in preparing spray suspensions of agricultural spray materials other than cuprous cyanide or mixtures containing cuprous cyanide as a predominating ingredient. For example, when dry Bordeaux mixture or calcium arsenate is substituted in place of cuprous cyanide in my compositions, and treated by my herein described process, the results are not analogous as shown by the fact that on dilution to a spraying concentration the permanency of the suspension is not materially increased; the suspensions practically completely settle out in about 5 minutes. On the other hand, I have applied my process to a variety of grades of cuprous cyanide, obtained from various sources and have obtained uniformly good results in all cases.

My process can be applied to the preparation of cuprous cyanide pastes of various concentrations over a wide range. For example I have prepared pastes satisfactory in all respects which contained as low as 10% and as high as 50% by weight of cuprous cyanide. However, for commercial purposes I have found that a paste containing approximately 33% by weight of cuprous cyanide ordinarily is the most satisfactory. Although satisfactory pastes containing 50% or more cuprous cyanide may be made, these are somewhat too thick to be easily prepared, while pastes containing around 10% by weight of cuprous cyanide are somewhat too thin for economical transportation.

My invention is not limited to the specific amounts of colloids shown in the above examples, since the amount added depends upon the nature of the colloid and the concentration and state of sub-division of the cuprous cyanide in the paste or spraying solution. I have found that in a 33% cuprous cyanide paste, 0.65% of gum tragacanth is enough to form a stable paste suitable for commercial purposes. An increase in the concentration of colloids usually will increase the permanency of the paste but at the same time will increase the cost. The amount of protective colloids required for any specific paste concentration can readily be determined by simple experiment. I have found that the various known organic protective colloids, including the various commercial carbohydrate types of dispersing agents, are suitable for preparing stable cuprous cyanide pastes in accordance with my invention and assist in keeping the cuprous cyanide dispersed at spraying concentrations.

Although I prefer to subject a paste composed of cuprous cyanide, protective colloids, and water to violent mechanical action by passing the paste through a gear pump, colloid mill or grinding in a ball mill or equivalent means, my invention is not limited to these specific methods; the mechanical action to which the paste mixture is subjected must be of such nature that the original particles or aggregates of the cuprous cyanide are materially reduced in size. This may be accomplished by a grinding method, e. g., wet grinding in a ball mill or the like, or by a violent agitation, such as occurs in a gear pump designed for pumping liquids when operated at a high speed. The term "violent mechanical action" is used in the appended claims to designate a grinding or agitating treatment necessary in my method and typified by the above specifically shown means.

I may also add other insecticide or fungicide materials to my cuprous cyanide compositions which are compatible therewith and which do not cause separation of the dispersion. By preparing mixture of various insecticide materials, I am able to protect the plants from the ravages of several insect pests or fungi by a single spraying.

I claim:

1. Process for preparing a stable cuprous cyanide paste comprising subjecting a mixture of 10 to 50 parts by weight of cuprous cyanide, a small amount of a protective colloid and about 90 to 50 parts by weight of water to a violent mechanical action in such manner as to disintegrate the cuprous cyanide into a finely divided and readily dispersible state.

2. Process for preparing cuprous cyanide compositions comprising subjecting a pasty mixture of cuprous cyanide, water and gum tragacanth to a grinding action, said mixture containing not less than about 10% by weight of cuprous cyanide.

3. Process for preparing a stable cuprous cyanide paste comprising subjecting a mixture of about 33 parts by weight of cuprous cyanide, about 0.5–1.5 parts by weight of gum tragacanth and about 66.5–65.5 parts by weight of water to a grinding action.

4. Process for preparing a stable cuprous cyanide paste comprising subjecting to a grinding action a pasty mixture of cuprous cyanide, water and a protective colloid selected from the group consisting of gelatine, agar-agar and gum tragacanth, said mixture containing not less than about 10% by weight of cuprous cyanide.

5. Process for preparing a stable cuprous cyanide paste comprising subjecting to a grinding action a mixture of about 33 parts by weight of cuprous cyanide, about 66.5–65.5 parts by weight of water and about 0.5–1.5 parts by weight of a protective colloid selected from the group consisting of gelatine, agar-agar and gum tragacanth.

6. A finely ground mixture of pasty consistency comprising 10 to 50 parts by weight of finely divided cuprous cyanide, a small amount of a protective colloid and about 90 to 50 parts by weight of water.

7. A finely ground mixture of pasty consistency comprising an aqueous dispersion of cuprous cyanide having substantially the following composition: about 33 parts by weight of cuprous cyanide, 0.5-1.5 parts by weight of gum tragacanth and about 66 parts by weight of water.

8. A finely ground mixture of pasty consistency comprising an aqueous dispersion of cuprous cyanide and gelatine containing 10 to 50% by weight of cuprous cyanide.

9. A finely ground mixture of pasty consistency comprising an aqueous dispersion of cuprous cyanide and agar-agar containing 10 to 50% by weight of cuprous cyanide.

10. A process comprising preparing a pasty mixture of cuprous cyanide, water and a protective colloid selected from the group consisting of gelatine, agar-agar and gum tragacanth, said mixture containing not less than 10% by weight of cuprous cyanide and subjecting said mixture to mechanical treatment in such manner that the cuprous cyanide particles in said mixture are reduced to a finely divided and readily dispersible state.

PAUL LA FRONE MAGILL.